Patented Oct. 11, 1932

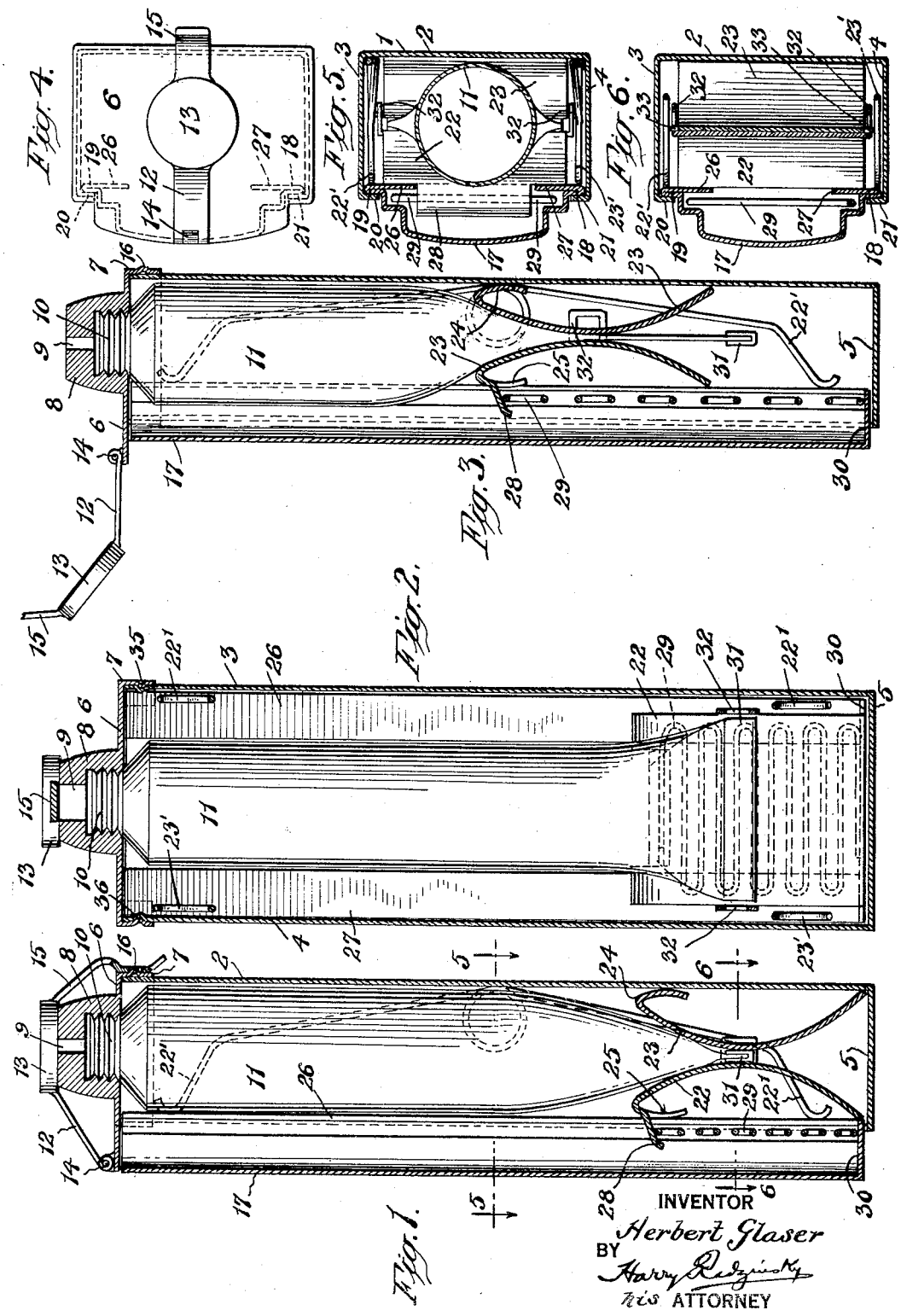

1,882,358

UNITED STATES PATENT OFFICE

HERBERT GLASER, OF NEW YORK, N. Y., ASSIGNOR OF ONE-FOURTH TO HARRY RADZINSKY, OF NEW YORK, N. Y.

PASTE DISPENSER

Application filed April 4, 1931. Serial No. 527,677.

This invention relates to a container and a dispensing device for collapsible tubes of the character generally used for containing tooth paste, cold cream, shaving cream and other similar substances of a paste-like consistency. The object of this invention is to provide a simple and easily operated form of container for such tubes, which container will be provided with means for causing the contents of the tube to be dispensed by a pressing action on one of the walls of the container. Through the use of a container of the character described, the contents of the tube are kept clean and of the proper consistency, and said contents are ejected from the tube by an easy manual pressing action. The tube, when used in a container of the type which forms the subject matter of this invention is protected thereby; is kept closed and the contents of the same are therefore always clean and sanitary, and, since the contents are emptied by mechanical means forming part of this invention, all of the contents are removed from the tube before the tube is discarded, thus preventing waste and affording consequent economy in use.

I am aware that prior to my invention various devices have been conceived for ejecting the contents of collapsible tubes. In some cases, such prior devices were intended for fixed attachment to a wall or other supporting surface. In other cases, the device required the use of two hands for its manipulation, thus rendering it undesirable. The construction of my improved container and paste dispenser is such that it is not permanently attached to a supporting surface, thus rendering it readily portable and useful to the traveler. It can also be easily operated with one hand, leaving the other hand free to hold a tooth brush, shaving brush or other object upon which the paste is to be distributed.

With the objects and advantages set forth above, I have devised the particular arrangement of parts set forth below and more particularly pointed out in the claims appended hereto.

Reference is to be had to the accompanying drawing, forming a part hereof, in which Figure 1 is a longitudinal sectional view of my improved container and paste-dispensing means;

Figure 2 is a sectional view of the same taken at right angles to that of Figure 1;

Figure 3 is a sectional view similar to Figure 1, showing how the tube-compressing means operates when the movable wall on the container is manually pressed;

Figure 4 is a plan view of the container;

Figure 5 is a sectional view on the line 5—5 of Figure 1, looking in the direction of the arrows; and Figure 6 is a sectional view on the line 6—6 of Figure 1, looking in the direction of the arrows.

Throughout the various views of the drawing, similar reference characters designate similar parts.

In the embodiment of my invention disclosed in the accompanying drawing, 1 indicates the body or casing of the tube-containing chamber.

Said chamber is formed with three fixed and preferably integral side walls 2, 3 and 4, and also with an integral bottom 5.

The upper end of the chamber thus formed is normally closed by a closure cap or cover 6, which is provided with a flange or skirt 7 that snaps into engagement with the container walls as at 35 and 36 to hold said cover securely yet manually removable on the end of the container body.

The cover 6 is provided with a projecting spout 8 that is internally threaded to receive the threaded neck 10 that is usually provided on collapsible tubes, one of which is disclosed at 11. The spout 8 is provided with an opening 9 through which the contents of the tube are dispensed as will be hereinafter pointed out.

A hinged spout-cover is disclosed at 12, the same being pivoted to the cover 6 as shown at 14. Said spout-cover is provided with an enlarged central portion or cap 13 that fits securely over the end of the spout 8 to effectively close the top of the same. A tongue 15 is formed on the spout-cover, said tongue being adapted to snap into engagement with a projection 16 on the skirt 7 of the container-cover 6, as disclosed in Figure 1 to hold the spout-cover in its closed position.

At 17 is disclosed a movable wall on the container. Said wall is preferably shaped as shown, and is provided with flanged longitudinal edge parts 18 and 19 which extend behind inturned flanges 20 and 21 that are provided on the fixed walls 3 and 4 respectively, of the container body. Springs 22' and 23' within the container bear against the faces of the parts 18 and 19 and act to normally thrust the wall 17 outwardly, the outward movement thereof being restricted by the abutment of the parts 18 and 19 against the fixed flanges 20 and 21 on the container.

At 22 and 23 is shown the tube-compressing means which consists of a pair of curved spring-plates located within the container and capable of longitudinal movement therein. These two plates act to squeeze the tube between them and eject the contents therefrom. The plate 23 is formed with a downwardly bent flange 24 at its upper edge, said flange having its face resiliently bearing and slidable against the inner face of the fixed wall 2 of the container. The plate 22 has a similar flange 25 which bears against the face of the parts 26 and 27 that are integrally formed on the movable wall 17. A portion of the flange 25 is bent outwardly as at 28 to form an abutment for the upper end of a spring 29 that is contained within the movable wall 17 and which has its lower end resting on the bottom 30 thereof. The tube-compressing plates 22 and 23 are loosely connected together, their connection being such that the lower end 31 of the tube 11 may be readily inserted between them, as disclosed in Figure 1. Such loose connection is attained by means of slotted tongues 32 formed on one of the plates, which tongues loosely receive the projections 33 formed on the other plate.

From the foregoing, the manner in which my improved device operates will be readily understood. To place a tube of paste in position, the cover member 6 is removed, and, after the customary cap provided on the tube is removed and discarded, the tube neck 10 is securely threaded into the spout 8. The tube is then inserted into the container 1, so that the lower end 31 of said tube extends between the plates 22 and 23 as shown in Figure 1. The cover 6 is then snapped in position on the end of the container. To eject the paste, it is merely necessary to raise the spout cover 12, as shown in Figure 3, and manually press inwardly on the movable wall 17. Such application of manual inward pressure on the wall 17 causes the plates 22 and 23 to be squeezed and partially flattened, as shown in Figure 3, so that the same will apply pressure on the tube body 11 disposed between them, thus ejecting the paste through the spout opening 9. It will be clear that as the paste is progressively depleted, the tube-compressing plates 22 and 23 will be shifted lengthwise of the tube toward the spout, said plates thus following the tube contents toward the top of the tube until all of said contents have been ejected from the tube. The flattened tube is then removed and a new one inserted in the manner heretofore described.

Since the device is operated by a simple inward pressure on the wall 17, it will be apparent that one-handed operation of the device may be easily had, thus leaving the other hand of the user free to hold a tooth brush, shaving brush or the like to receive the ejected paste. The hinged cover member 12, which can readily be raised or snapped into closed position by the fingers of the hand, acts to prevent evaporation of the tube contents. The insertion of a new tube is a very simple matter, and the device is unfailing in operation.

What I claim is:—

1. A device of the class described comprising a tube container, a movable member forming a part of said container and disposed longitudinally of a tube within the container, tube-compressing means within the container and adapted to maintain yielding contact with the flattened lower end of a collapsible tube in said container, said tube-compressing means being caused to compress the tube by manual inwardly-exerted pressure on the movable member, and means for causing the tube-compressing means to be elevated as the contents of the tube are emptied therefrom.

2. A device of the class described comprising a container having a movable side-wall, means for compressing the body of a tube situated within the container by pressure on said wall, and means for causing the tube-compressing means to be constantly maintained against the flattened tube-end and shifted lengthwise of the tube as the tube contents are emptied.

3. A device of the class described comprising a container for collapsible tubes, means within the container for compressing a collapsible tube when one of the walls of the container is pressed inwardly, said means comprising a pair of plates between which the tube is pressed, and means for constantly holding said plates in contact with the flattened tube-end and shifting said plates lengthwise of the tube as the tube contents are emptied.

4. A device of the class described comprising a container for collapsible tubes, said container being provided with a movable wall, means within said container operated upon by said wall for compressing a collapsible tube within the container when said wall is manually pressed inwardly, said means comprising a pair of flexible members between which the tube is compressed, and means for shifting said members lengthwise of the tube.

5. A device of the class described comprising a container having a cover member, means thereon for engaging the threaded end of a collapsible tube, a closure member hinged to said cover, a spring-pressed wall on the container, a pair of tube-compressing spring plates within the container adapted to be compressed by manual pressure on the container wall, and means within the container for elevating the plates as the contents of the tube are depleted.

6. A device of the class described comprising a container for holding a collapsible tube compressing means comprising a pair of spring plates loosely connected together, means for shifting said plates lengthwise of the supported tube, and a movable wall on the container for applying pressure on one of said plates.

7. A device of the class described comprising a chamber for containing a collapsible tube, said chamber being provided with a manually movable wall, means within the chamber for compressing the tube when said means are operated upon by the movable wall, said tube compressing means being adapted to maintain a constant yielding contact with the flattened lower end of a collapsible tube in the chamber, and means for causing said tube-compressing means to be shifted progressively toward the open end of the tube with the dispensing of the tube contents.

Signed at the city, county and State of New York, this 3rd day of April, 1931.

HERBERT GLASER.